Sept. 20, 1960  C. BARASSI  2,953,181
PNEUMATIC TIRE FOR USE ON ICE AND SNOW
Filed May 24, 1957  3 Sheets-Sheet 1
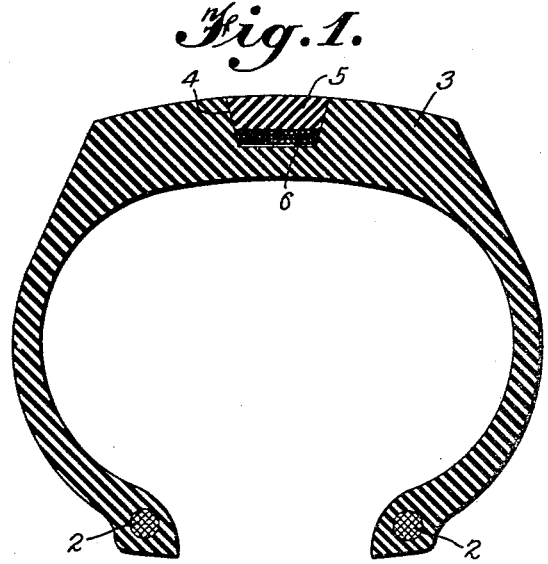
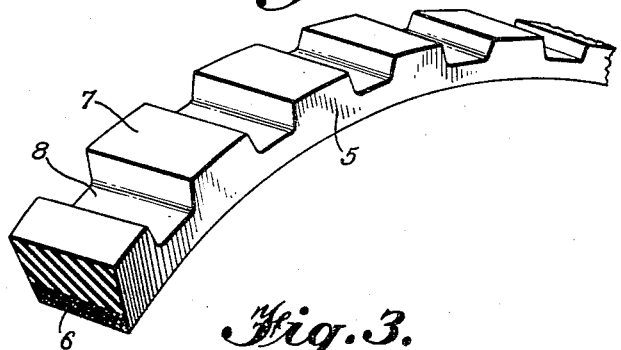
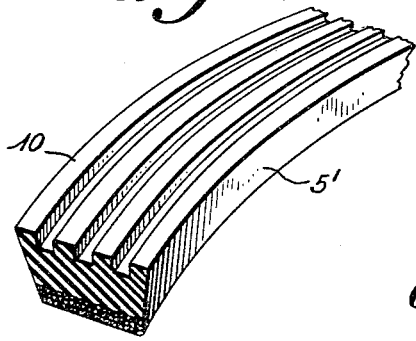
INVENTOR
*Carlo Barassi*
BY *Stevens, Davis, Miller & Mosher*
ATTORNEYS INVENTOR
*Carlo Barassi*

Sept. 20, 1960         C. BARASSI                2,953,181
           PNEUMATIC TIRE FOR USE ON ICE AND SNOW
Filed May 24, 1957                          3 Sheets-Sheet 3
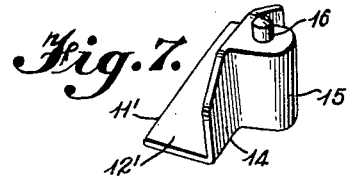
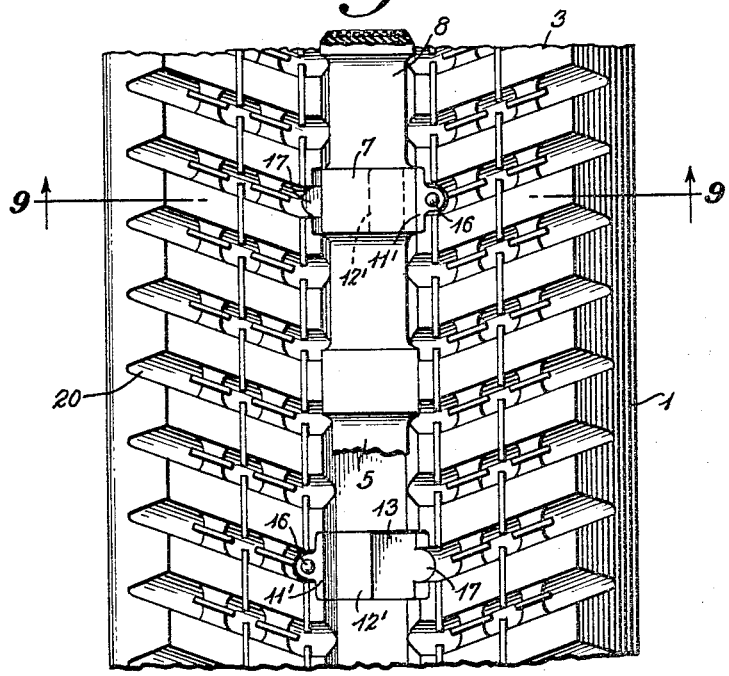
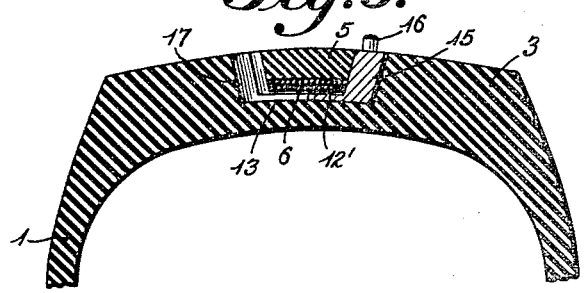
INVENTOR
*Carlo Barassi*
BY *Stevens, Davis, Miller & Mosher*
ATTORNEYS United States Patent Office 2,953,181
Patented Sept. 20, 1960

2,953,181

PNEUMATIC TIRE FOR USE ON ICE AND SNOW

Carlo Barassi, Milan, Italy, assignor to Pirelli S.p.A., Milan, Italy

Filed May 24, 1957, Ser. No. 661,338

Claims priority, application Italy May 29, 1956

3 Claims. (Cl. 152—176)

The present invention pertains to a vehicle tire of the pneumatic type which is advantageously suited for use on ice and snow. More particularly, this invention relates to a tire of the above type wherein there is employed a removable tread ring which may be received in a suitable annular groove or seat located in the central part of the tire tread.

In the lower part of this ring, i.e., adjacent to the inner annular portion thereof, there is incorporated a textile or metallic reinforcing element disposed in a substantially longitudinal (or circumferential) direction. Also, in order to insure optimum adherence of the removable ring to the tire casing, these reinforcements must have low elongation characteristics, the latter in any event being of a lesser order than those of the reinforcing textile elements normally used in tire casings. The relative dimensions of the tire and ring are such that the latter may be slipped onto the tire only when the tire is deflated. Therefore, with the ring properly seated and the tire inflated, the casing will always be under compression and the ring under tension so as to prevent relative sliding movement which would be detrimental to the operation of this type of tire.

Preferably, this ring is provided with an outer pattern of the transversal type (for example similar to that of a spur gear) adapted to insure good traction. The present invention also includes a plurality of metallic elements which may be interposed between the ring and the tire casing. These metallic elements are provided with one or more projecting points which extend radially outward beyond the tread profile so as to engage in gripping contact any snow or ice which might be situated beneath the tire. Preferably, these points are constructed from a material of great hardness and strong resistance to abrasion; also, the outer ends of these projecting points should be beveled, and preferably at obtuse angles. The sides of said metallic elements are provided with laterally thickened zones and the sides and bottom of said annular groove are provided with suitable depressions for accommodating the shape of each metallic element. Therefore, when the removable ring is properly secured on the tire, the metallic elements are firmly locked in position.

Since, in the winter season, ice is generally present in addition to snow, the present invention can be applied to advantage in snow tires of the type described in Italian Patent 472,985, thus providing a tire equally suitable for running on snow or ice. Moreover, such a tire can be used on clean or bare roads by simply removing the metallic elements, without a considerable reduction in the traveling comfort and without danger to the road surface. Thus, the present invention achieves a speed and comfort remarkably greater than that resulting from the employment of conventional chains or creepers.

On the other hand, when it is desired to use this tire other than during the winter season, the snow-type ring may be detached and replaced by another ring of identical internal structure having an outer directional pattern more suitable for travelling at high speeds.

A principal advantage of this invention lies in the fact that the ring can be easily assembled on the deflated tire. The inflation pressure then secures the ring in position by placing the longitudinal reinforcing elements under tension.

As will hereinafter appear, two different shapes of these metallic elements are included in the description of the present invention. Furthermore, other shapes apart from those shown or suggested herein may be employed within the spirit of this invention. The number of metallic elements to be mounted on each tire casing can be varied at will. However, in order to insure effective traction on ice and snow as well as good lateral stability, a sufficient number should be employed such that at least one metallic element will always be positioned in the region wherein the tire contacts the ground. For the purpose of providing additional protection, these metallic elements may also be covered with rubber by means of anyone of several wellknown cements employed for the adhesion of rubber to metal.

In the event that the tire is to function without the metallic elements, it has been found very advantageous to construct the removable ring from a material having different hardness characteristics from that of the tire itself which leads to a very satisfactory performance on slippery roads.

Therefore, in light of the above, it is a principal object of the present invention to provide a pneumatic vehicle tire having a peripheral annular groove and a complementary removable ring which can be received and secured in the groove of the tire; the outer surface configuration of this ring is such as to adapt the tire for use on snow or ice.

It is a further object of the present invention to provide, in a tire and ring structure of the type set forth above, a plurality of metallic elements which may be inserted between the ring and the tire; these metallic elements will have radially projecting points which extend outwardly beyond the profile of the tire tread so as to penetrate into any layer of ice and snow over which the tire may travel.

Other and further objects and advantageous features of the present invention will hereinafter more fully appear in connection with a detailed description of the drawings in which Figure 1 is a cross-sectional view of the tire and ring constructed in accordance with one modification of this invention;

Figure 2 is a perspective view of a portion of a ring which might be employed with the tire casing of Figure 1; the particular ring structure shown in Figure 2 is especially designed and adapted for use on snow or ice;

Figure 3 is a perspective view of a portion of a ring similar to that of Figure 2; however, this particular ring would be employed with the tire casing of Figure 1 for substantially normal travelling conditions when the roads are devoid of ice and snow;

Figure 7 is a modified form of the metallic element shown in Figure 4;

Figure 8 is an elevation similar to that of Figure 5 showing the relationship between the tire, the ring, and the modified metallic element illustrated in Figure 7;

Figure 9 is a fragmentary cross-sectional view taken along section line 9—9 of Figure 8.

Figure 5:
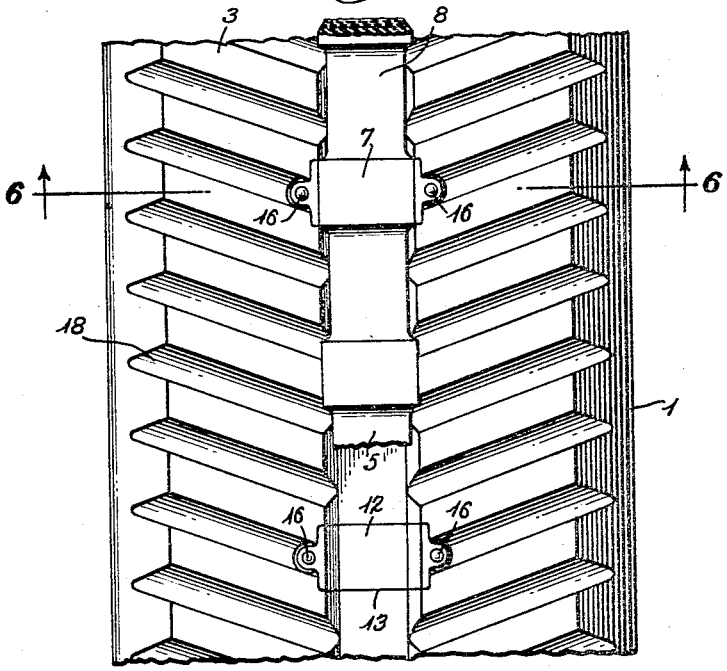
Figure 5 is a fragmentary elevation (normal to the tread of the tire) showing the relationship between the metallic element, the tire, and the ring.

Referring to the drawings in detail, Figure 1 shows a tire whose casing is generally designated by the reference numeral 1; this tire also has bead portions 2 and a tread portion 3 which may be of any desired design (see Figures 5 and 8). Centrally located with respect to the tread portion of the tire is an outer annular groove 4 in which the removable ring 5 is adapted to be received. The ring itself is vulcanized separately from the tire and may be installed or removed as desired. Generally, the width of the ring will be about one-sixth to one-third of the total tread width of the tire. The ring is further provided, adjacent its inner annular portion, with one or more circumferential layers of textile or metal threads or cords 6 which are made from a substantially inextensible material. The inner diameter of the ring 5 will be smaller than that of the groove 4 when the tire casing above has been inflated (without the ring). Thus, the ring can be placed upon the tire only when the latter is in a deflated condition. As indicated previously, when the tire has been inflated after the ring has been placed in the groove, the tire portion underlying the ring will be under compression and the ring itself will be under tension. Therefore, since the ring is substantially inextensible, it would be virtually impossible for any relative slipping to occur now between the tire casing and the ring.

In Figure 2, the ring 5 is shown as having an outer surface configuration similar to that of a spur gear; this configuration includes rectangular projections 7 and hollows 8 arranged in an alternate manner. This form of the ring is particularly suited for use on ice and snow.

In Figure 3, there is shown a modified ring 5' having a series of circumferentially projecting treads 10. When the ring 5' has been substituted for the ring 5 of Figure 2, the ring-tire combination is then especially designed for essentially normal use on roads which are devoid of ice and snow.

Figure 4:
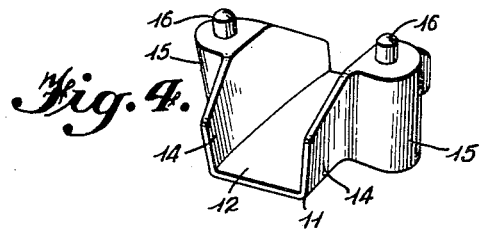
Figure 4 is a perspective view of one of the metallic elements adapted to be inserted between the ring and tire of the present invention.
Figure 6:
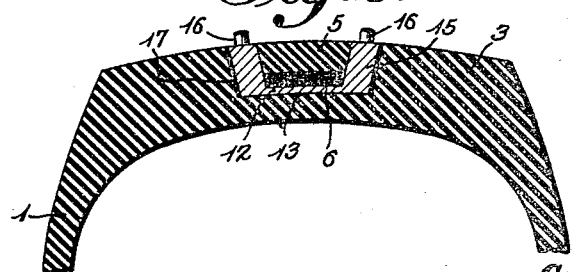
Figure 6 is a fragmentary sectional view taken along section line 6—6 of Figure 5.

In Figures 4, 5 and 6, the insertable metallic elements 11 are substantially channel-shaped, having a lower flat portion 12 adapted to underlie the inner annular surface of the ring 5 and also adapted to fit into the flat depression 13 formed on the inner surface of the groove 4 (see also Figure 9). The metallic elements 11 are also provided with a pair of right-angle flanges 14, 14, with outer laterally extending and thickened portions 15, 15. The tread portion of the tire itself generally designated as reference numeral 18 is one of many suitable treads which may be employed with the tire casing of the present invention.

As shown in Figures 7, 8 and 9, the metallic element 11' is similar to, but approximately only one-half that of, the metallic element 11 shown in Figure 4. Purely for the purposes of explanation, this modified form might be considered as being obtained by cutting through the longitudinal center line of the base 12 of the element 11 shown in Figure 4, thereby forming an abbreviated base 12' which is one-half (or less) of the original base 12.

The remaining portions of the metallic element 11' are substantially identical with the corresponding portion of the element shown in Figure 4 and are so numbered in the drawings. Purely for purposes of illustration and not by way of limitation, the tire tread shown in Figure 8, and designated by reference numeral 20, is somewhat different from that shown in Figure 5.

Other and further modifications, apart from those shown or suggested herein, may be made within the spirit of the present invention.

I claim:

1. A tire assembly for motor vehicle wheels, particularly adapted for use on ice and snow, comprising a tire casing having an outer tread portion and an annular peripheral groove located centrally within the outer tread portion of said casing, said annular groove having in cross-section an outer width at least equal to the width at its base, the outer width ranging from ⅙ to ⅓ of the total width of the tread portion of said casing, a removable tread ring receivable in said groove, said ring having imbedded therein, adjacent its inner annular surface, a plurality of circumferentially extending reinforcing elements made from material possessing low extensibility characteristics, said ring having an inner diameter smaller than that which the base of said groove would assume when the tire was in the inflated state devoid of said ring, and a plurality of road gripping units consisting of metallic elements removably clamped in position in said groove by said tread ring, each of said elements having at least one radially projecting point extending outwardly therefrom between the tread ring and the tread portion of the casing and beyond the profile of the tread pattern of said tire.

2. The tire assembly as set forth in claim 1 wherein said elements are channel-shaped, each element having a relatively flat base portion for underlying the inner surface of said ring and two thickened portions extending outwardly from said base portion on opposite sides of said ring, said thickened portions carrying said points.

3. The tire assembly as set forth in claim 1 wherein each of said elements is provided with a flat base portion for underlying a part, at least, of said ring, and a thickened portion extending outwardly from said base portion and carrying one of said points.

References Cited in the file of this patent

UNITED STATES PATENTS

| | | |
|---|---|---|
| 807,311 | Parker | Dec. 17, 1905 |
| 1,054,820 | Bowden | Mar. 4, 1913 |
| 1,450,800 | Frazier | Apr. 3, 1923 |
| 1,571,493 | Schumacher | Feb. 2, 1926 |
| 1,597,775 | Erb | Aug. 31, 1926 |
| 1,814,340 | Shelton et al. | July 14, 1931 |
| 2,575,249 | Connell et al. | Nov. 13, 1951 |
| 2,874,742 | Lugli | Feb. 24, 1959 |